(12) United States Patent
Chang et al.

(10) Patent No.: US 11,836,133 B2
(45) Date of Patent: Dec. 5, 2023

(54) IN-MEMORY DATABASE (IMDB) ACCELERATION THROUGH NEAR DATA PROCESSING

(71) Applicant: Samsung Electronics Co., Ltd., Suwon-si (KR)

(72) Inventors: Andrew Zhenwen Chang, Los Altos, CA (US); Vincent Tung Pham, San Jose, CA (US); Jaemin Jung, San Jose, CA (US)

(73) Assignee: SAMSUNG ELECTRONICS CO., LTD.

( * ) Notice: Subject to any disclaimer, the term of this patent is extended or adjusted under 35 U.S.C. 154(b) by 3 days.

(21) Appl. No.: 17/515,379

(22) Filed: Oct. 29, 2021

(65) Prior Publication Data
US 2023/0027648 A1 Jan. 26, 2023

Related U.S. Application Data

(60) Provisional application No. 63/223,543, filed on Jul. 19, 2021.

(51) Int. Cl.
*G06F 12/0882* (2016.01)
*G06F 16/248* (2019.01)
(Continued)

(52) U.S. Cl.
CPC .... *G06F 16/24539* (2019.01); *G06F 12/0882* (2013.01); *G06F 16/248* (2019.01); *G06F 16/24532* (2019.01); *G06F 16/24552* (2019.01)

(58) Field of Classification Search
CPC ........... G06F 16/24539; G06F 12/0882; G06F 16/24552; G06F 16/248; G06F 12/0851;
(Continued)

(56) References Cited

U.S. PATENT DOCUMENTS 6,784,889 B1 8/2004 Radke
8,074,026 B2 12/2011 Kim et al.
(Continued)

FOREIGN PATENT DOCUMENTS

WO 2020164718 A1 8/2020

OTHER PUBLICATIONS

ESP, "ESP Accelerator Specifications," Columbia University System Level Design Group, 2021, 10 pages.
(Continued)

*Primary Examiner* — Jorge A Casanova
(74) *Attorney, Agent, or Firm* — Renaissance IP Law Group LLP

(57) ABSTRACT

An accelerator is disclosed. The accelerator may include an on-chip memory to store a data from a database. The on-chip memory may include a first memory bank and a second memory bank. The first memory bank may store the data, which may include a first value and a second value. A computational engine may execute, in parallel, a command on the first value in the data and the command on the second value in the data in the on-chip memory. The on-chip memory may be configured to load a second data from the database into the second memory bank in parallel with the computation engine executing the command on the first value in the data and executing the command on the second value in the data.

20 Claims, 10 Drawing Sheets

(51) Int. Cl.
   *G06F 16/2453* (2019.01)
   *G06F 16/2455* (2019.01)
(58) Field of Classification Search
   CPC .............. G06F 12/0853; G06F 12/0284; G06F 12/0607; G06F 12/0859; G06F 12/04; G06F 2212/1024; G06F 2212/302; G06F 9/3885; G06F 9/30043; G06F 9/30047; G06F 9/544; G06F 13/1647; G06F 15/781
   See application file for complete search history.

(56) References Cited

U.S. PATENT DOCUMENTS

| | | | | |
|---|---|---|---|---|
| 9,952,975 | B2* | 4/2018 | Barron | G06F 13/4022 |
| 10,268,416 | B2* | 4/2019 | Jayasena | G06F 3/061 |
| 10,430,353 | B2* | 10/2019 | Hong | G06F 13/102 |
| 10,891,234 | B2 | 1/2021 | Noll et al. | |
| 2013/0238657 | A1* | 9/2013 | Brand | G06F 16/24539 |
| | | | | 707/E17.014 |
| 2015/0039478 | A1* | 2/2015 | Heumann | G06Q 40/12 |
| | | | | 705/30 |
| 2015/0143037 | A1* | 5/2015 | Smith | G06F 3/065 |
| | | | | 711/148 |
| 2015/0262127 | A1* | 9/2015 | Ziegler | G06F 16/955 |
| | | | | 705/342 |
| 2015/0331720 | A1* | 11/2015 | Huetter | G06F 9/544 |
| | | | | 718/104 |
| 2016/0283114 | A1* | 9/2016 | Kimura | G06F 13/4022 |
| 2018/0074965 | A1* | 3/2018 | Aguilera Diez | G06F 12/0862 |
| 2021/0035255 | A1 | 2/2021 | Nurvitadhi et al. | |
| 2021/0117131 | A1* | 4/2021 | Kim | G06F 3/0604 |
| 2021/0117333 | A1 | 4/2021 | Qureshi et al. | |
| 2021/0141794 | A1* | 5/2021 | Picorel | G06F 16/24537 |
| 2021/0216220 | A1* | 7/2021 | Kim | G06F 3/0656 |
| 2021/0240393 | A1* | 8/2021 | Jo | G06F 3/0652 |
| 2021/0271680 | A1* | 9/2021 | Lee | G06F 12/063 |
| 2022/0083681 | A1* | 3/2022 | Du | G06F 16/1734 |

OTHER PUBLICATIONS

European Extended Search Report for Application No. 22183264.5, dated Dec. 7, 2022.

Xi, Sam Likun et al., "Beyond the Wall Near-Data Processing for Database," DaMoN'15: Proceedings of the 11th International Workshop on Data Management on New Hardware, 2015, 10 pages.

* cited by examiner

IN-MEMORY DATABASE (IMDB) ACCELERATION THROUGH NEAR DATA PROCESSING

RELATED APPLICATION DATA

This application claims the benefit of U.S. Provisional Patent Application Ser. No. 63/223,543, filed Jul. 19, 2021, which is incorporated by reference herein for all purposes.

FIELD

The disclosure relates generally to databases, and more particularly to acceleration of various database queries using near-data processing.

BACKGROUND

Some database queries may involve data stored in a processor cache: that is, the data in the cache may have been loaded previously and reused with a later database query. But some database queries may consider data only once. For such queries, loading data into the processor cache, only to discard that data shortly thereafter, may be an inefficient use of the cache. Further, before data may be loaded into the processor cache, it may be necessary to evict some other data from the processor cache. If the data chosen for eviction is used in a later database query, that data may be loaded again into the processor cache, resulting in a slower response for that query.

A need remains to process queries while using the cache efficiently and without adversely affecting other processing.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
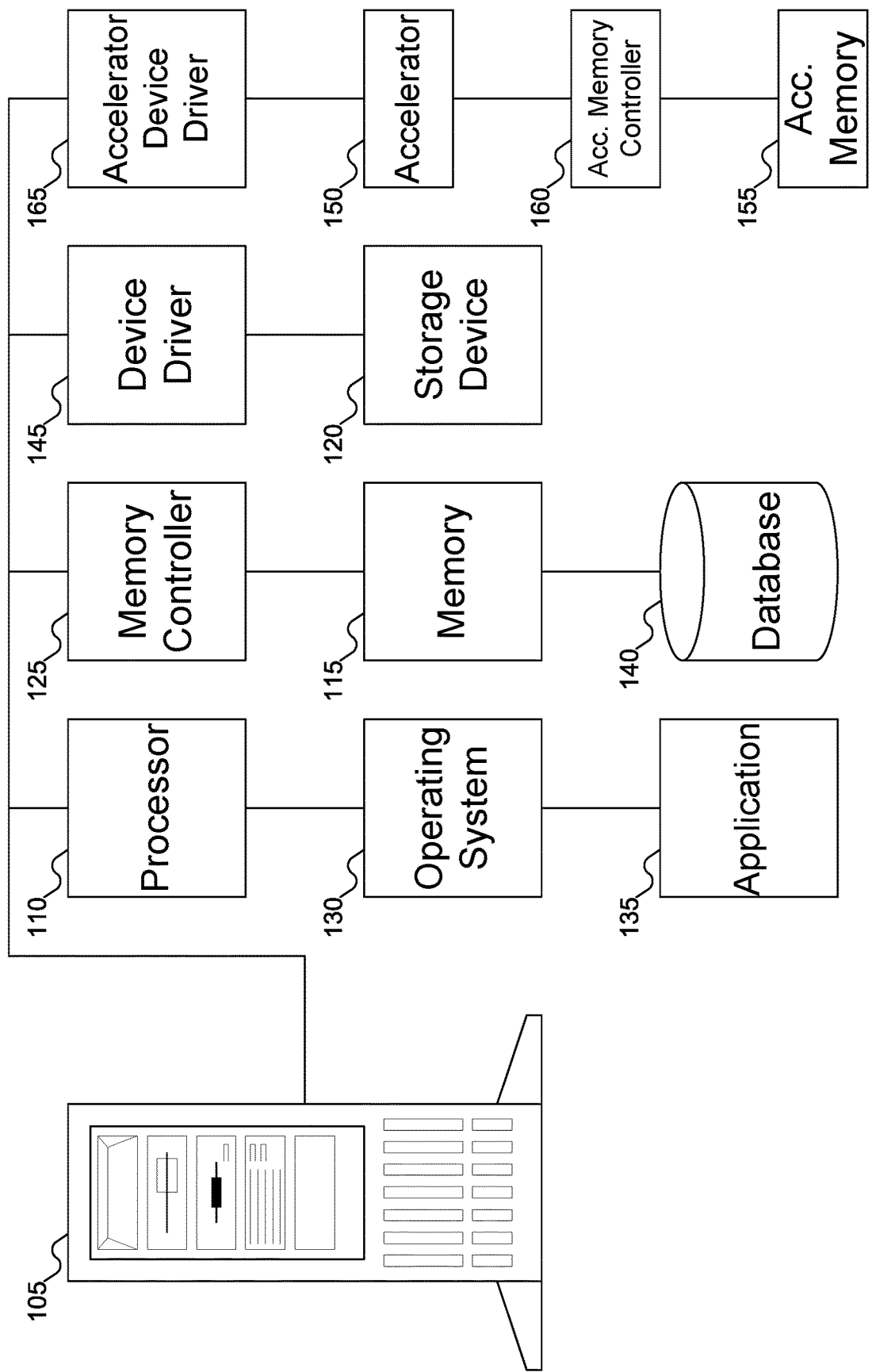
FIG. 1 shows a system including an accelerator supporting in-memory database (IMDB) commands, according to embodiments of the disclosure.

Embodiments of the disclosure include an accelerator to support in-memory database processing (IMDB) processing. The accelerator may receive a request from an application, load data from a database, and execute commands on the data in parallel, after which a result may be returned to the application.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Database queries may take several different forms. Some queries may be expected to respond quickly: for example, a query to process a transaction. Other queries may be expected to take longer: for example, queries of the database to locate entries matching a search criteria. Queries to search the database do not usually benefit from caching: data may be moved from memory into the cache, accessed once, then discarded. This sequence results in inefficient cache usage, as other data that might benefit from caching may be discarded. In addition, the processing involved in moving data in and out of the cache may have a negative impact on queries that are expected to respond quickly, thereby affecting other processing involving the database.

Embodiments of the disclosure address these problems by offloading processing of some database queries to near-data processing. By processing such queries near to the data, inefficient use of the cache in a host processor may be avoided. In addition, by processing such queries near to the data, the host processor may be free to handle other database requests. Further, the near-data processing may be able to provide parallel operations on the database, which may produce a result of the query faster than the host processor might provide. As a result, the host processor may be able to respond to latency-sensitive requests more quickly.

FIG. 1 shows a system including an accelerator supporting in-memory database (IMDB) commands, according to embodiments of the disclosure. In FIG. 1, machine 105 (which may also be termed a host, host machine, host computer, host system, computer, or system) may include processor 110 (which may also be termed a host processor), memory 115 (which may also be termed a host memory), and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system, such as operating system 130, under which various applications may be running. These applications may issue requests (which may also be termed commands) to read data from or write data to either memory 115 or storage device 120. For example, application 135 may be an application that performs operations, such as updates and queries, on database 140. Storage device 120 may be accessed using device driver 145. While FIG. 1 shows memory 115 as including database 140, embodiments of the disclosure may have database 140 stored on storage device 120, or even remote from machine 105. While FIG. 1 uses the generic term "storage device", embodiments of the disclosure may include any storage device formats that may benefit from the use of data quality metrics, examples of which may include hard disk drives and Solid State Drives (SSDs). Any reference to "SSD" or any other particular form of storage device below should be understood to include such other embodiments of the disclosure. In addition, while FIG. 1 shows one storage device 120, embodiments of the disclosure may include any number (one or more) of storage devices.

Finally, machine 105 may include accelerator 150. Accelerator 150 may be designed to support operations on an in-memory database (IMDB) (sometimes called an IMDB system (IMDBS) or an IMDB management system (IMDBMS)), such as database 140. As such, accelerator 150 may be thought of as a near-memory accelerator. Accelerator 150 may be designed to use any desired bus: for example, a memory bus or a Peripheral Component Interconnect Express (PCIe) bus.

To support operations within accelerator 150, accelerator 145 may include accelerator memory 155 and accelerator memory controller 160. Accelerator memory 155 and accelerator 160 may be similar to memory 115 and memory controller 125, respectively, but may be used by accelerator 150 for operations within accelerator 150. Thus, for example, accelerator memory 155 may be DRAM, and may be smaller than, comparable in size to, or larger than memory 115. By using accelerator memory 155, accelerator 150 may be able to access data from database 140 without affecting other commands being issued by processor 110 or application 135. Application device driver 165 may be used to load data, such as the portion of database 140 to be stored in accelerator 150, into accelerator memory 155.

In some embodiments of the disclosure, application 135 may "partition" database 140 between memory 115 and accelerator memory 155. This partition may be determined based on data that may be expected to be used by accelerator 150. That is, data in database 140 that may be expected to be used by accelerator 150 may be stored in accelerator memory 155, and data that is not expected to be used by accelerator 150 may be stored in memory 115. The portion of database 140 that is in memory 115 may be accessed by processor 110 using conventional load/store commands. The portion of database 140 that is in accelerator 150, on the other hand, may be accessed by processor 110 using conventional load/store commands, but accelerator 150 may also execute commands on the portion of database 140. In some embodiments of the disclosure, rather than dividing database 140 between memory 115 and accelerator memory 155, the portion of database 140 stored in accelerator memory 155 may be a copy of the data in memory 115 (although in such embodiments of the disclosure it may be important to keep data in memory 115 and accelerator 150 synchronized).

In other embodiments of the disclosure, accelerator 150 may be implemented in a format that accommodates where database 140 is stored. If database 140 is stored in memory 115, accelerator 150 may be implemented as a memory module similar to memory 115 (which may locate accelerator 150 close to database 150. For example, if memory 115 is implemented as a Dual In-line Memory Module (DIMM) because that is the format supported by machine 105, then accelerator 150 may also be implemented as a DIMM. Alternatively, if database 140 is stored in storage device 120, then accelerator 150 may be implemented as a circuit that connects to storage device 120 (for example, connected to the same bus—for example, a PCIe—as connects processor 110 and storage device 120). Or, accelerator 150 may be implemented as part of storage device 120. Note that depending on the implementation, accelerator device driver 165 might be combined with one or more other device drivers, such as device driver 145. Accelerator 150 is discussed further with reference to FIGS. 3 and 6 below.

In typical operation, processor 110 may perform operations on database 140. These operations may involve loading data from database 140 into a page cache in processor 110, after which the operations may be performed on the page cache. But if the data in the page cache is not needed again, the data was loaded into the page cache for only one operation, which is not efficient. Further, because loading data into the page cache may involve evicting some other data already in the page cache, the end result may be the eviction of data from the page cache that might be used again, only to make room for data that might not be needed again. By evicting the data that might be used again, requests that use that data may have to wait for the data to be reloaded into the page cache, slowing down such requests. Accelerator 150 may support offloading requests to avoid such impacts on the page cache and other operations that may be processed by processor 110.

Figure 2:
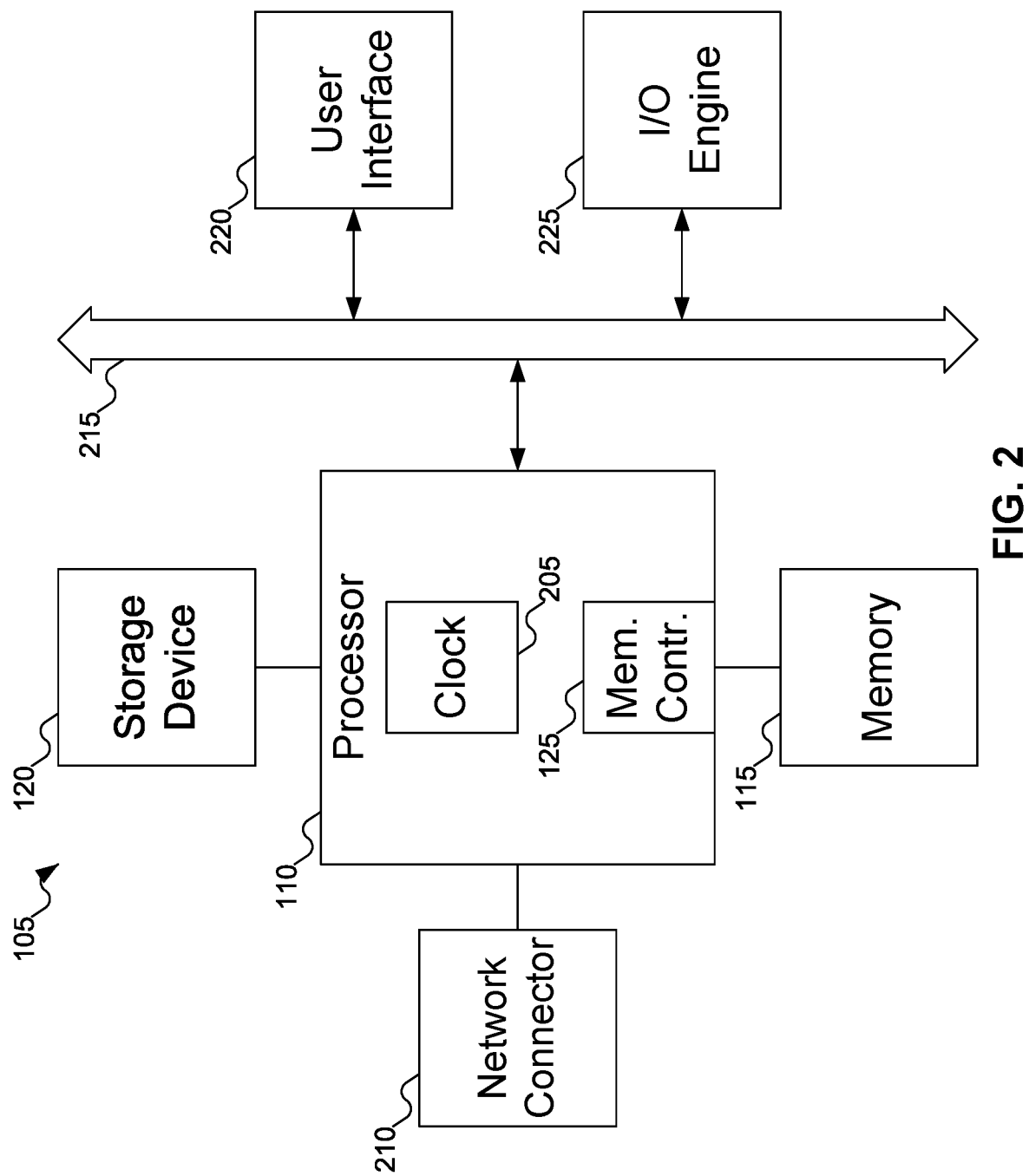
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
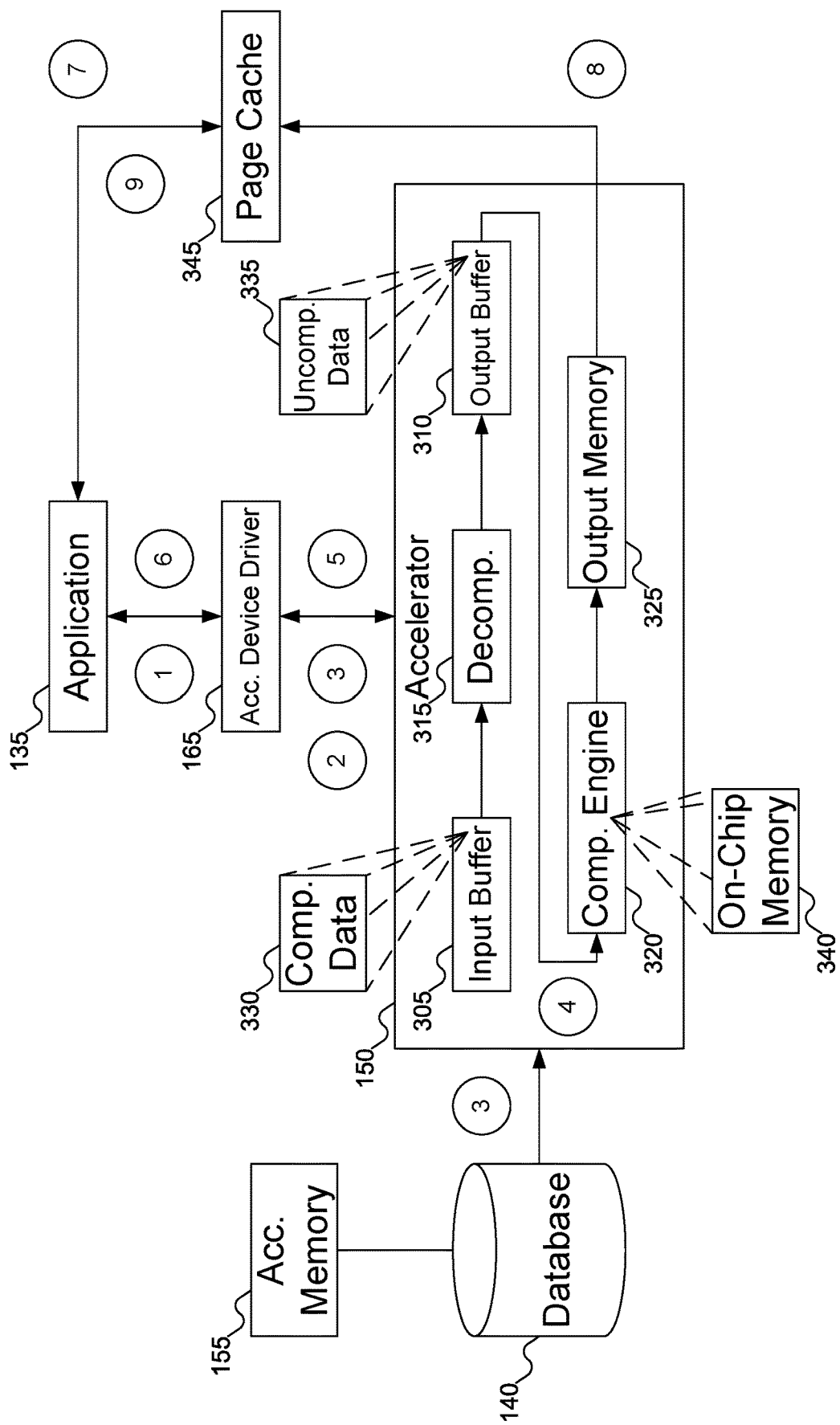
FIG. 3 shows the operations performed by the application of FIG. 1, the accelerator device driver of FIG. 1, and the accelerator of FIG. 1, according to embodiments of the disclosure.

FIG. 3 shows the operations performed by application 135 of FIG. 1, accelerator device driver 165 of FIG. 1, and accelerator 150 of FIG. 1, according to embodiments of the disclosure. In FIG. 3, application 135, accelerator memory 155, database 140, accelerator device driver 165, and accelerator 150 are shown. These elements are the same as discussed above with reference to FIG. 1 (although database 140 as shown in FIG. 3 may be the portion of database 140 in accelerator memory 155, rather than the entirety of database 140).

Accelerator 150 may include input buffer 305 and/or output buffer 310, decompressor 315, computation engine 320, and output memory 325. Accelerator may also include other elements not shown in FIG. 3: for example, an input cache or elements discussed further with reference to FIG. 6 below.

In machine 105 of FIG. 1, application 135 may issue a request (shown as circle 1 in FIG. 3). This request may be a request to offload processing from processor 110 of FIG. 1 to accelerator 150. This request may identify the command application 135 would like accelerator 150 to execute: the command may be identified either as a parameter of the request, or by the procedure call itself. For example, this request may utilize an application programming interface (API) offered by accelerator device driver 165. This request may also specify the data to be accessed from database 140.

Accelerator device driver 165 may be a device driver that supports accelerator 150. Accelerator device driver 165 may differ from device driver 145 of FIG. 1, as the former may support accelerator 150 and the latter may support storage device 120 of FIG. 1. But in some embodiments of the disclosure, if designed to support both accelerator 150 and some other device such as storage device 120 of FIG. 1, accelerator device driver 165 may be combined with some other device driver such as device driver 145 of FIG. 1. Upon issuing the request, application 135 may go to sleep until the request is completed.

Upon receiving the request from application 135, accelerator device driver 165 may flush data from the cache of processor 110 of FIG. 1 that may be used by accelerator 150 (either as an input or as an output) (shown as circle 2 in FIG. 3). These operations may be performed to ensure that accelerator 150 uses the most current data (the cache in processor 110 may have more current data than database 140) and to prevent processor 110 from reading data that is to be replaced with the results from accelerator 150. Note that in some embodiments of the disclosure, input buffer 305, output buffer 310, and/or output memory 325 may be completely overwritten when new data is provided to these elements, thus obviating the need to erase input buffer 305, output buffer 310, or output memory 325; in other embodiments of the disclosure, these elements may also be erased to clear them of stale data. Accelerator device driver 165 may then assign the request to accelerator 150, load data from database 140 into input buffer 310, and may, if needed, translate the request into a command that may be performed by accelerator 150 (shown as circle 3 in FIG. 3). For example, accelerator device driver 165 may support an API that specifies how application 135 may request accelerator 150 provide support. The particular API used, or a particular parameter of the API, may identify the particular operation to be performed by accelerator 150: accelerator device driver 165 may then translate the request into a particular command to be executed by accelerator 150, and may specify this command in a form recognized by accelerator 150.

Loading data into input buffer 310 may also include pre-fetching data from database 140 into input buffer 310 before such data is needed. By pre-fetching data, accelerator 150 may spend as much time as possible processing the command rather than waiting for data to be loaded. Note, too, that, as discussed with reference to FIG. 4 below, accelerator 150 may operate using two or more memory banks in a "ping pong" manner, so that the command may be performed on one memory bank while another memory bank may be loaded with other data for processing.

When data is loaded from database 140 into input buffer 305, it may be that only a portion of database 140 is loaded into accelerator 150. For example, database 140 might include megabytes (MB) or gigabytes (GB) of data, but input buffer 305 and/or output buffer 310 might be limited to a smaller capacity, say, 64 bytes, 128 bytes, or 4 kilobytes (KB). (Data may be read from database 140 in units of any desired size: 64 bytes, 128 bytes, and 4 KB are used here only as example sizes.) Since input buffer 305 and/or output buffer 310 may be too small to store the entirety of database 140, only portions of database 140 may be loaded into accelerator 150 at a time. Once a particular portion has been processed, a new portion may be loaded into input buffer 305 and/or output buffer 310 for processing. Accelerator 150 may then process each portion in this manner separately, and then provide cumulative results at the end.

But database data may be highly parallel. Even if data is read from database 140 in small units, parallel operations may be possible. For example, if the values in database 140 are each only four bytes, 64 bytes of data as read from database 140 may contain 16 values, and 4 KB of data as read from database 140 may contain 1024 values, each of which might be relevant to a particular operation.

Database 140 may be a compressed database. By compressing database 140, the amount of storage required for the data may be reduced. For example, consider a database where a single value is used for a large percentage of the database, with the remainder used by various other values. Such a database may benefit from sparse compression. In sparse compression, a bit vector may be used to represent which values are compressed and which are not. With sparse compression, a single bit may be used to represent the most frequent value; the remaining values may then be stored normally (or using some other compression algorithm) plus one additional bit (the bit indicating that the value was not sparse compressed). As a crude example of how this may be beneficial, consider a database storing 1,000,000 values, each requiring four bytes, and 90% of these values (that is, 900,000 values) are all a single value. To store this database uncompressed would require 4,000,000 bytes (four bytes for each of 1,000,000 values). But to store this database compressed would require 1 bit for 1,000,000 values to store the bit vector, plus 4 bytes for the 100,000 "infrequent" values: a total of 125,000 bytes (1,000,000 bits divided by 8 bits per byte) bytes, plus 400,000 bytes, or 525,000 bytes, roughly an 87% reduction in the storage requirements.

But if database 140 is compressed, then decompression may be needed to access the actual data. Input buffer 305 may be used to store compressed data 330 from database 140; decompressor 315 may then be used to decompress compressed data 330 and store decompressed (or uncompressed) data 335 in output buffer 310. The specifics of how decompressor 315 function may depend on the particular compression algorithm used to compress database 140.

Continuing the example of sparse compression, decompressing database 140 may involve managing data from multiple streams. Sparse compressed data may include three vectors: a bitmap vector (which, as discussed above, identifies which entries use the compressed value and which do not), a nonzero vector (which may store values that are not the most frequent value in database 140), and a position vector (which may indicate where nonzero values are stored). The nonzero vector and the position vector may be unpacked to construct a nonzero table, which may then be used by a sparse lookup unit, based on the bitmap vector: if the bitmap vector indicates that a particular value is compressed, then the most frequent value may be used; otherwise, the appropriate value may be read from the nonzero table.

These three vectors may be read from database 140 as needed: there is no guarantee that the streams providing these vectors are synchronized. Thus, it may be important to ensure that the vectors remain synchronized, and data may be read from the streams only as needed, rather than reading all three streams at the same rate or as soon as there is room for new data.

Decompressor 315 may take any desired form. For example, decompressor 315 may be a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU), to name some possibilities.

Decompressor 315 is not discussed here further, except to note that accelerator 150 may support any number (zero or more) decompressors 315, and thus may be able to decompress databases compressed using various different compression algorithms.

In embodiments of the disclosure where database 140 is not compressed, decompressor 315 may be bypassed or omitted, and input buffer 305 and output buffer 310 may be the same buffer. In the remainder of this document, references to output buffer 310 may be understood as also referencing input buffer 305 should database 140 not be compressed.

Once the data has been decompressed (if needed), then computation engine 320 may perform the offloaded operation (shown as circle 4 in FIG. 3). Computation engine 320 may take any desired form: for example, computation engine 320 may be an FPGA, an ASIC, a CPU, a GPU, a GPGPU, or a TPU, to name some possibilities. Computation engine 320 may be "hardwired" (in the sense that computation engine 320 may not be reconfigured) to perform specific commands, or computation engine 320 may support more general purpose commands and may be able to download a "program" (that is, a sequence of commands) from application 135.

Computation engine 320 may include on-chip memory 340, which may be where computation engine 320 carries out the requested commands. Computation engine may load data from output buffer 310 into on-chip memory 340 to perform the commands, after which results may be output to output memory 325. On-chip memory 340 may be a memory that is relatively fast (as compared with accelerator memory 155 or output buffer 310) to use for computation engine 320. As a result, on-chip memory 340 may be more expensive than the memory used for accelerator memory 155 or output buffer 310, and may be implemented in smaller quantities than accelerator memory 155 and/or output buffer 310. But in some embodiments of the disclosure, computation engine 320 may operate on data in output buffer 310 or accelerator memory 155.

As just described, once computation engine 320 has executed the command, the results may be stored in output memory 325. Accelerator 150 may then report the offloading is complete to accelerator device driver 165 (shown as circle 5 in FIG. 3). Accelerator device driver 165 may then wake up application 135 (shown as circle 6 in FIG. 3). Application 135 may then attempt to access the result from page cache 345 (shown as circle 7 in FIG. 3). Upon attempting to access page cache 345, accelerator 150 or accelerator device driver 165 may load the data from output memory 325 into page cache 345 (shown as circle 8 in FIG. 3) by, for example, using a direct memory access from accelerator 150, after which the result may be returned from page cache 345 to application 135 (shown as circle 9 in FIG. 3).

The above discussion refers to output memory 325 as a "memory", but embodiments of the disclosure may include any form of storage for the result of the request. The use term "output memory" should not be limited to just a memory: for example, output memory 325 may be some sort of a cache or non-volatile storage. The above description also suggests that decompressor 315 may be distinct from computation engine 320, but embodiments of the disclosure may have computational engine 320 perform the functions of decompressor 315, rather than including decompressor 315 as a separate component.

In FIG. 3, page cache 345, which may be stored in memory 115 of FIG. 1 or be part of processor 110 of FIG. 1, is used as a mechanism to provide application 135 access to the results when direct access to output memory 325 or other memory of accelerator 150 is not supported. That is, application 135 may be able to access memory 115 of FIG. 1 or processor 110 of FIG. 1 even when application 135 does not have access to output memory 325, but If application 135 may directly access output memory 325, the operations to access the result from page cache 345, move the result to page cache 345, and then return the result from page cache 345 may be reduced to just a direct access by application 135 of output memory 325.

As discussed above, application 135 may involve different types of operations on database 140. For example, some operations performed on database 140 may include online transaction processing (OLTP) and online analytical processing (OLAP). For example, consider a website for a business. The website may permit users to search for particular items, and to purchase selected items. Searching for items that meet particular criteria may be an example of OLAP; purchasing selected items may be an example of OLTP. OLTP may involve a (relatively) few number of entries in database 140. For example, continuing the example of a website for a business, OLTP may involve decrementing the count for a few items in the database, as well as processing payment. OLAP, on the other hand, may require examining a (relatively) large number of entries (and potentially all entries) in database 140 to identify the entries that meet the search criteria specified by the user. For example, if the user is interested in a hammer, it may be necessary to examine every entry in database 140 to determine which entries are for hammers and which are not. The scope of this search may be reduced using various keys in database 140; but even then, a (relatively) large number of entries may need to be considered to complete the search.

While in general all operations are expected to complete quickly, in practice some operations are expected to complete more quickly than others. For example, a search through a website for products that meet a particular search criteria (such as searching for products that are hammers) may be expected to take longer than an operation to purchase selected items. After all, searching through database 140 to find all hammers may be expected to take some time; completing a purchase when the items have all been selected and are known to be in stock may be expected to be completed quickly.

OLTP operations may involve multiple operations on the same data. For example, before selecting a particular item for purchase, the user may have looked at the details about that item on the website. Thus, the details may already be loaded in the cache in processor 110 of FIG. 1. On the other hand, OLAP operations may result in many entries that are irrelevant to the user and therefore are not looked at. Such data may have been loaded into the cache of processor 110 but not be of interest and may be discarded without being looked at more closely by the user. Even worse, if the data loaded to perform the search of database 140 causes data relevant to an OLTP operation to be evicted from the cache in processor 110 of FIG. 1, then that data may be loaded again into the cache of processor 110 of FIG. 1, slowing down the OLTP operation. Thus, the inefficient use of the cache in processor 110 of FIG. 1 may not only affect OLAP operations but also OLTP operations.

OLTP operations may benefit from being handled by processor 110 of FIG. 1. But OLAP operations may be performed roughly as efficiently by accelerator 150 as by processor 110 of FIG. 1. In fact, accelerator 150 may be able to handle OLAP operations more efficiently than processor 110 of FIG. 1. For example, accelerator 150 may be designed with parallelism in mind, and thus may be able to perform more operations in the same number of cycles as compared with processor 110 of FIG. 1.

From the perspective of accelerator 150, there are two forms of parallelism that may be considered. The first form of parallelism is temporal parallelism, which reflects the concept that data may be managed to hide the latency associated with fetching data from database 140. For example, by organizing on-chip memory 340 into multiple memory banks, it may be possible to load data into one memory bank while data is being processed in the other memory bank. The second form of parallelism is spatial parallelism, which reflects the concept that when data is read from database 140, that data may include multiple values to which the command may be applied. Spatial parallelism may be a consequence of the fact that database 140 may be organized in forms, such as tables, that group related data together, and therefore there may be many values of interest in data read from database 140.

Figure 4:
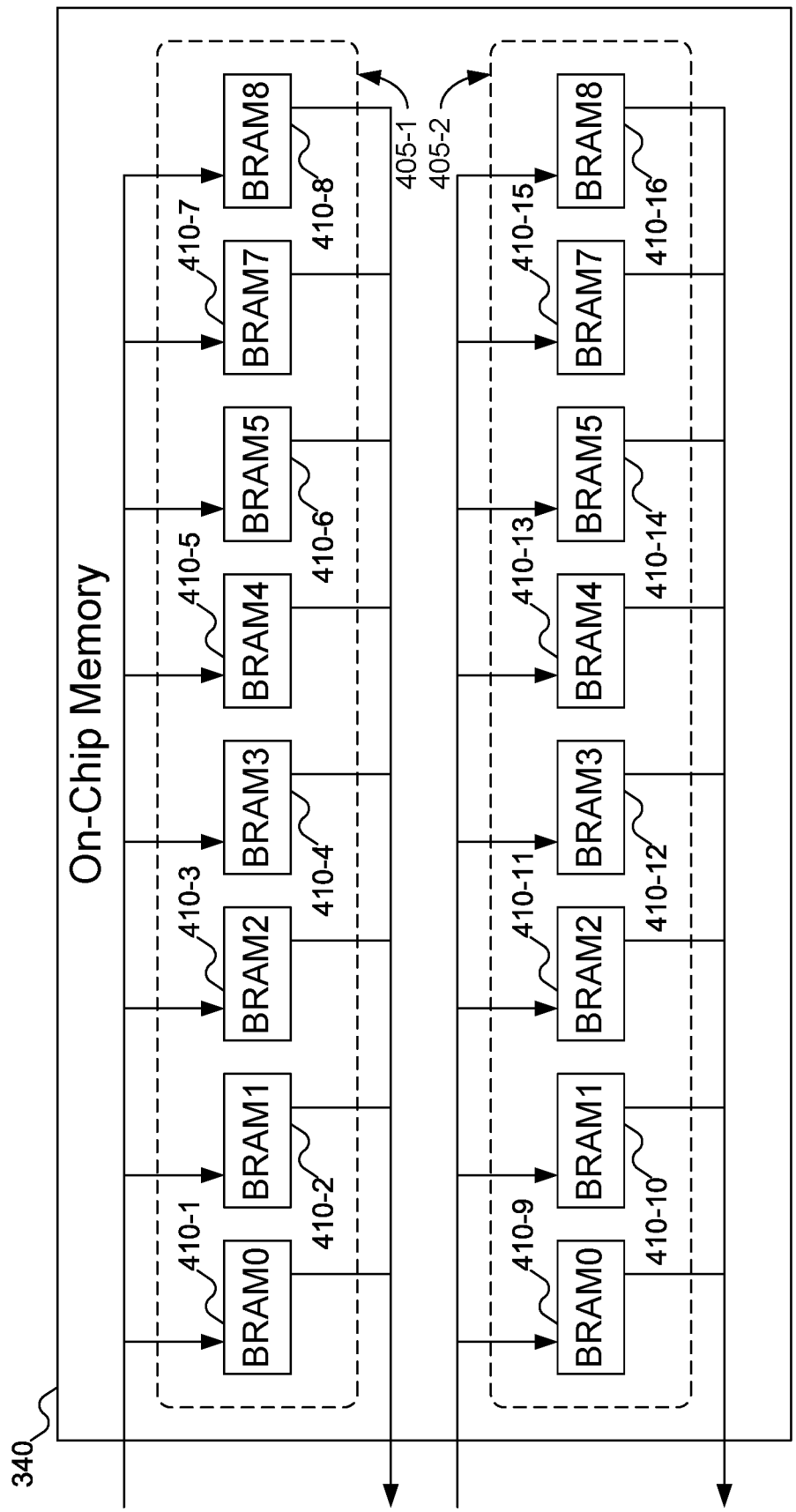
FIG. 4 shows details of the on-chip memory of FIG. 3, according to embodiments of the disclosure.

FIG. 4 shows details of on-chip memory 340 of FIG. 3, according to embodiments of the disclosure. In FIG. 4, on-chip memory 340 is shown. On-chip memory 340 is shown as including two memory banks 405-1 and 405-2 (which may be referred to collectively as memory banks 405). While FIG. 4 shows on-chip memory 340 as including two memory banks 1005, embodiments of the disclosure may support any number of memory banks in on-chip memory 340. Memory banks 405 may each store a number of memory units. FIG. 4 shows memory bank 405-1 as including memory units 410-1 through 410-8, and memory bank 405-2 as including memory units 410-9 through 4510-16. Memory units 410-1 through 410-16 (which may be referred to collectively as memory units 410) may be any type of memory unit. For example, FIG. 4 shows memory units 410 as block RAM (BRAM), but embodiments of the disclosure may use other memory units as well.

By utilizing two memory banks 405, memory 310 may be used like a "ping pong buffer". That is, operations may be performed on memory bank 405-1 while data is being loaded into memory bank 405-2. But in addition, commands may be executed on each memory unit 410 in parallel. For example, recall the example above involving searching for entries in database 140 of FIG. 1 that are hammers. Each memory unit 410 may store a portion of the (uncompressed) data from database 140, and each memory unit 410 may look at a different entry (that is, a different value within that portion of the (uncompressed) data to see if that entry includes a hammer. Thus, each memory unit 410 may store its own copy of the (uncompressed) data from database 140, but may process different entries from that data. Alternatively, memory units 410-1 through 410-16 may all be loaded with data from database 140 of FIG. 1 at the same time, and may process data in parallel.

Figure 5:
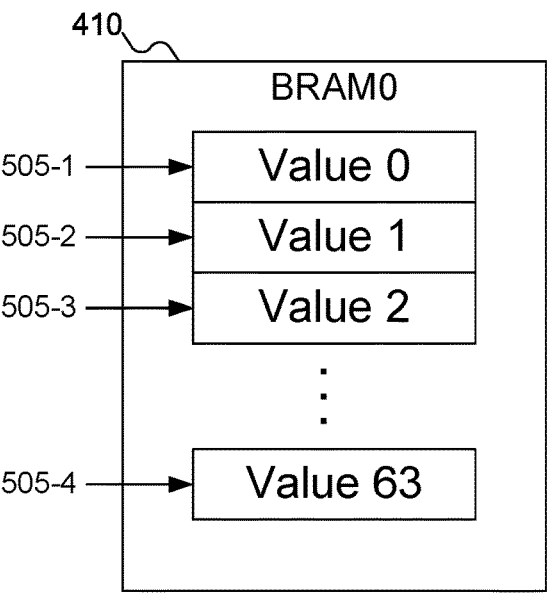
FIG. 5 shows details of values that may be stored in the memory units of FIG. 4, according to embodiments of the disclosure.

Looking momentarily at FIG. 5, FIG. 5 shows details of values that may be stored in memory unit 410 of FIG. 4, according to embodiments of the disclosure. Memory unit 410 may store, for example, 64 bytes worth of data, shown as values 505-1 through 505-4 (which may be referred to collectively as values 505). (Memory unit 410 may store larger or smaller amounts of data than 64 bytes, and each value may be larger or smaller than one byte: these sizes are merely for purposes of example.) This same 64 bytes of data may be stored in each memory unit 410 in FIG. 4. But each memory unit 410 in FIG. 4 may operate on a different value. For example, memory unit 410-1 of FIG. 4 may operate on value 505-1, memory unit 410-2 of FIG. 4 may operate on value 505-2, memory unit 410-3 of FIG. 4 may operate on value 505-3, and so on.

Returning to FIG. 4, it may be noted that FIG. 4 shows a total of 16 memory units 410, whereas each memory unit is described as potentially storing 64 different values. In such circumstances, commands may be performed on each memory unit multiple times to consider all values in each memory unit. For example, with a total of 64 values 505 of FIG. 5 in each memory unit 410 and 16 memory units 410 in memory 310, a command may be performed four times (64÷16=4) on different values in each memory unit. Embodiments of the disclosure may include any number of memory units and any number of values stored in each memory unit, which may result in varying numbers of commands per memory unit to consider all values.

There are many different ways in which to determine which values are processed using individual memory units. Continuing the example where each memory unit 410 stores 64 values 505 of FIG. 5 in each of 16 memory units 410, each memory unit 410 may be responsible for a contiguous group of four values. For example, memory unit 410-1 may be responsible for processing the first four values 505 of FIG. 5, memory unit 410-2 may be responsible for processing the second four values 505 in FIG. 5, and so on. Or, each memory unit 410 may be responsible for processing values whose numbers have a specific value modulo 16. For example, memory unit 410-1 may be responsible for processing values 0, 16, 32, and 48 (all of which have a remainder of zero modulo 16), memory unit 410-2 may be response for processing values 1, 17, 33, and 49 (all of which have a remainder of one modulo 16), and so on. Embodiments of the disclosure may also support other ways to determine which memory units 410 are responsible for processing particular values 505 of FIG. 5 from the data.

While FIG. 4 shows memory 310 as including 16 memory units 410 organized into two memory banks 405, embodiments of the disclosure may include any number (one or more) of memory banks 405, each of which may include any number (one or more) of memory units 410. While memory 310 may be configured in hardware, as discussed above, data may remain in memory units 410 to support commands being performed on multiple values in each memory unit 410. In this manner, accelerator 150 of FIG. 1 may be configurable to handle data read from database 140 of FIG. 1 at any desired level of granularity, and with any number of values being processed from each memory unit 410 until all values have been processed.

While FIG. 4 focuses on on-chip memory 340, some embodiments of the disclosure may have computation engine 320 of FIG. 3 operate on accelerator memory 155 of FIG. 1 or output buffer 310 of FIG. 3. In such embodiments of the disclosure, accelerator memory 155 of FIG. 1 or output buffer 310 of FIG. 3 may also be organized into memory banks, similar to the organization of on-chip memory 340, to enable parallel operations, and may perform operations on multiple values within the data.

Figure 6:
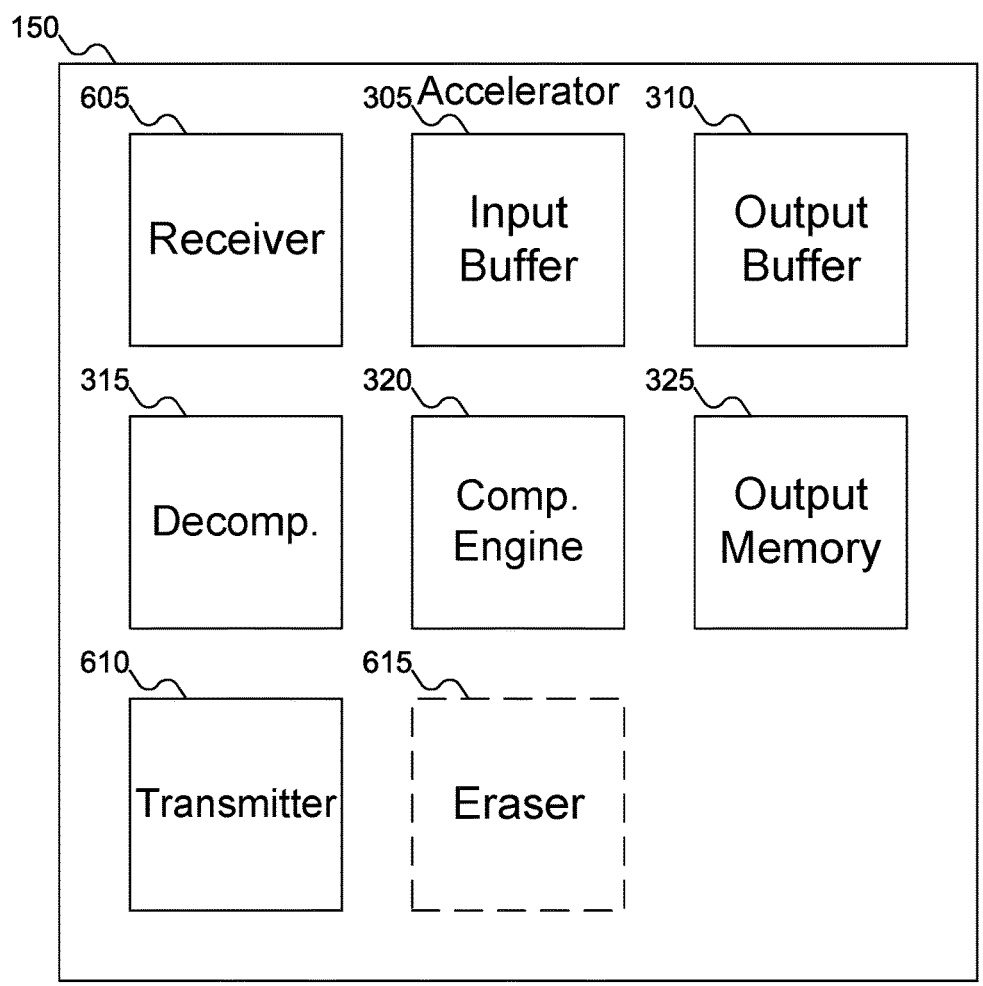
FIG. 6 shows details of the accelerator of FIG. 1, according to embodiments of the disclosure.

FIG. 6 shows details of accelerator 150 of FIG. 1, according to embodiments of the disclosure. In FIG. 6, accelerator 150 is shown as including receiver 605, input buffer 305, output buffer 310, decompressor 315, computational engine 320, output memory 325, and transmitter 610. The functions of input buffer 305, output buffer 310, decompressor 315, computational engine 320, and output memory 325 are discussed above with reference to FIG. 3 and will not be repeated here.

Receiver 605 may receive from accelerator device driver 165 of FIG. 1 a request for accelerator 150 to execute a command. Receiver 605 may also include an input cache to store data received from database 140 of FIG. 1, which may be used in embodiments of the disclosure where accelerator 150 does not have an associated accelerator memory 155 of FIG. 1.

Transmitter 610 may send a signal to accelerator device driver 165 of FIG. 1 to report that the requested command has completed execution. Transmitter 610 may also be responsible for transferring a result from output memory 325 to page cache 345 of FIG. 3.

Accelerator 150 may also include eraser 615. Eraser 615 may flush the input cache, erase input buffer 305 and/or output buffer 310, and may flush output memory 325. In embodiments of the disclosure where data in input buffer 305, output buffer 310, and/or output memory 325 may be overwritten, eraser 610 may be omitted, as shown by the dashed lines.

In the embodiments of the disclosure described above, accelerator 150 may include its own input buffer 305 and/or output buffer 310, which may be separate from memory 115 of FIG. 1 or accelerator memory 155 of FIG. 1 of machine 105 of FIG. 1. But some embodiments of the disclosure may support machine 105 of FIG. 1 and accelerator 150 combining memory 115 of FIG. 1, accelerator memory 155, input buffer 305, and/or output buffer 310, so as to present a picture of machine 105 of FIG. 1 and accelerator 150 each being capable of supporting larger amounts of memory. Such embodiments of the disclosure may use a cache-coherent interconnect protocol, such as the Compute Express Link® (CXL) protocol, to present a combined memory to applications. (Compute Express Link is a registered trademark of the Compute Express Link Consortium, Inc.) In such embodiments of the disclosure, accelerator 150 of FIG. 1 may access data from memory 115 of FIG. 1 and/or accelerator memory 155 of FIG. 1, rather than necessarily from input buffer 305 and/or output buffer 310.

Figure 7:
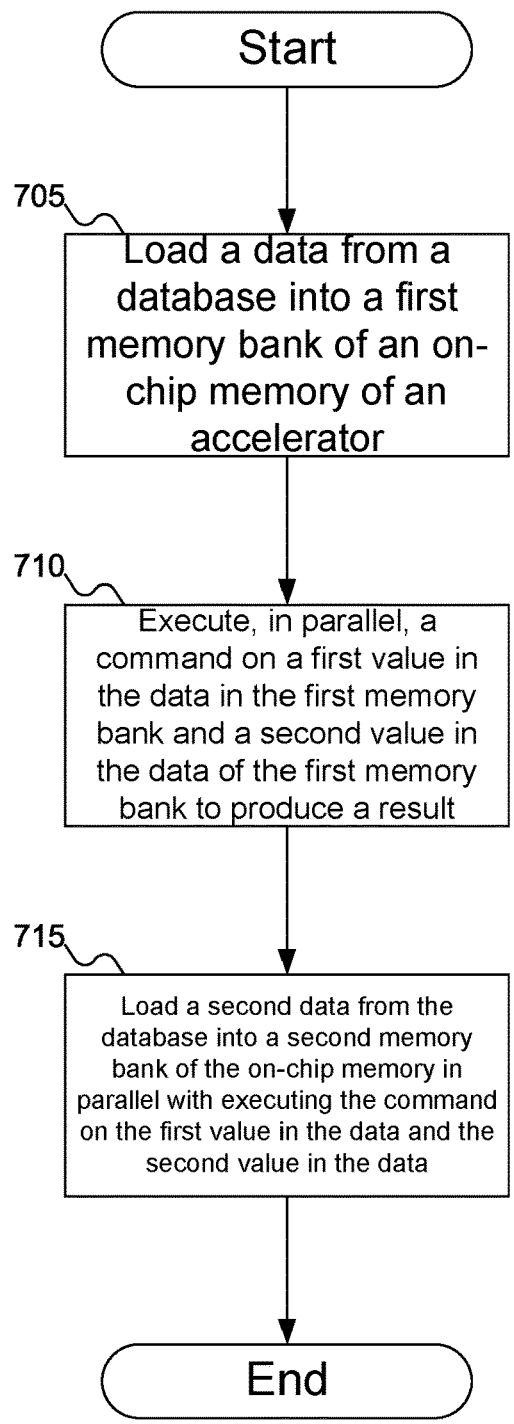
FIG. 7 shows a flowchart of an example procedure to use the accelerator of FIG. 1 to support IMDB processing, according to embodiments of the disclosure.

FIG. 7 shows a flowchart of an example procedure to use accelerator 150 of FIG. 1 to support IMDB processing, according to embodiments of the disclosure. In FIG. 7, at block 705, accelerator 150 of FIG. 1 may load data from database 140 of FIG. 1 into a first memory bank 405 of FIG. 4. At block 710, accelerator 150 of FIG. 1 may execute a command on data from database 140 of FIG. 1. The command may be executed on multiple values 505 of FIG. 5 in memory bank 405 of FIG. 4 in parallel, rather than sequentially. Finally, at block 715, accelerator 150 of FIG. 1 may load data from database 140 of FIG. 1 into a second memory bank 405 of FIG. 4. Accelerator 150 of FIG. 1 may load data into the second memory bank 405 of FIG. 4 in parallel with executing the command on the values in the first memory block 405 of FIG. 4 as in block 710.

Figure 8A:
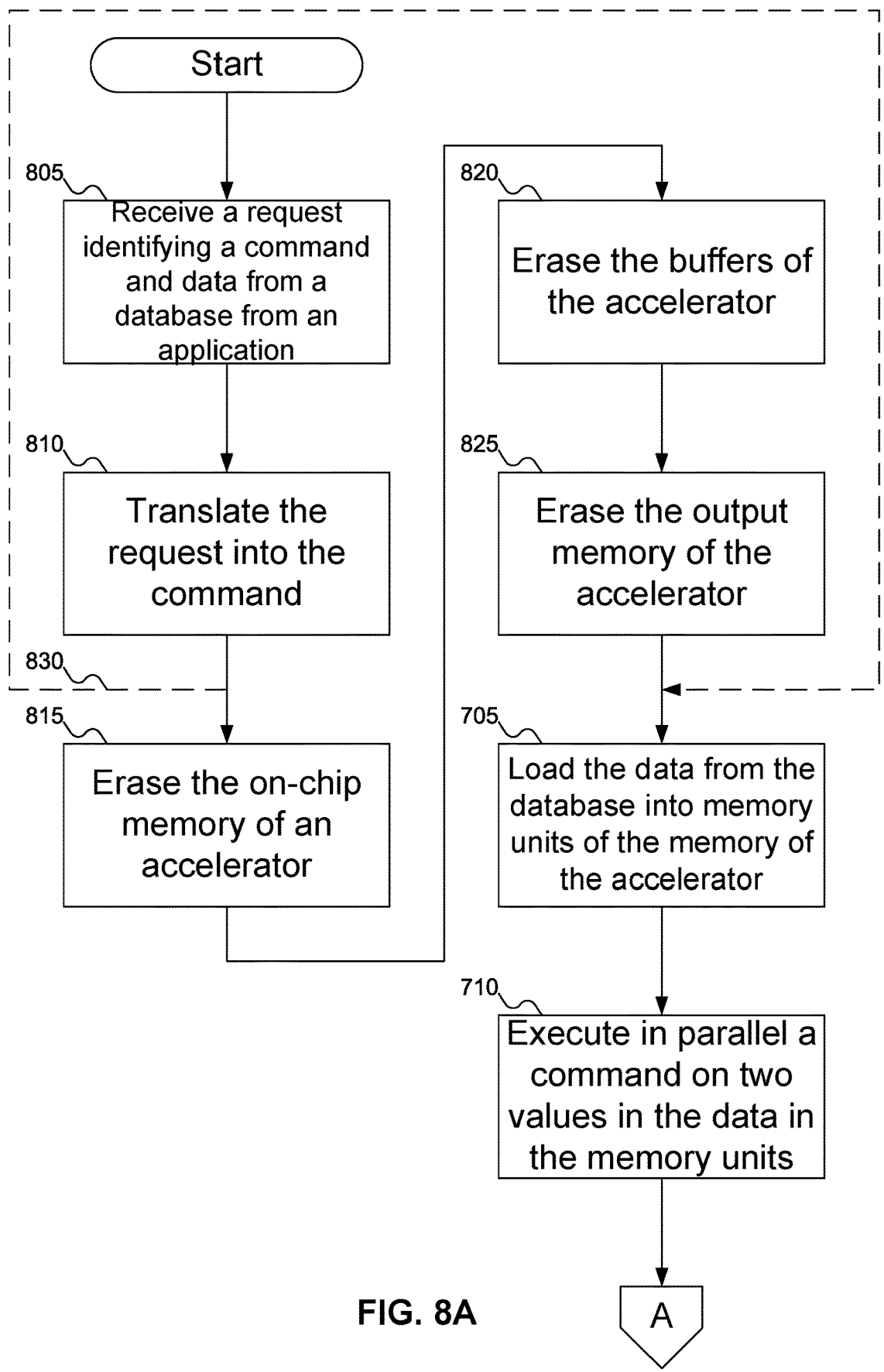
FIG. 8A shows an alternative flowchart of an example procedure to use the accelerator of FIG. 1 to support IMDB processing, according to embodiments of the disclosure.
Figure 8B:
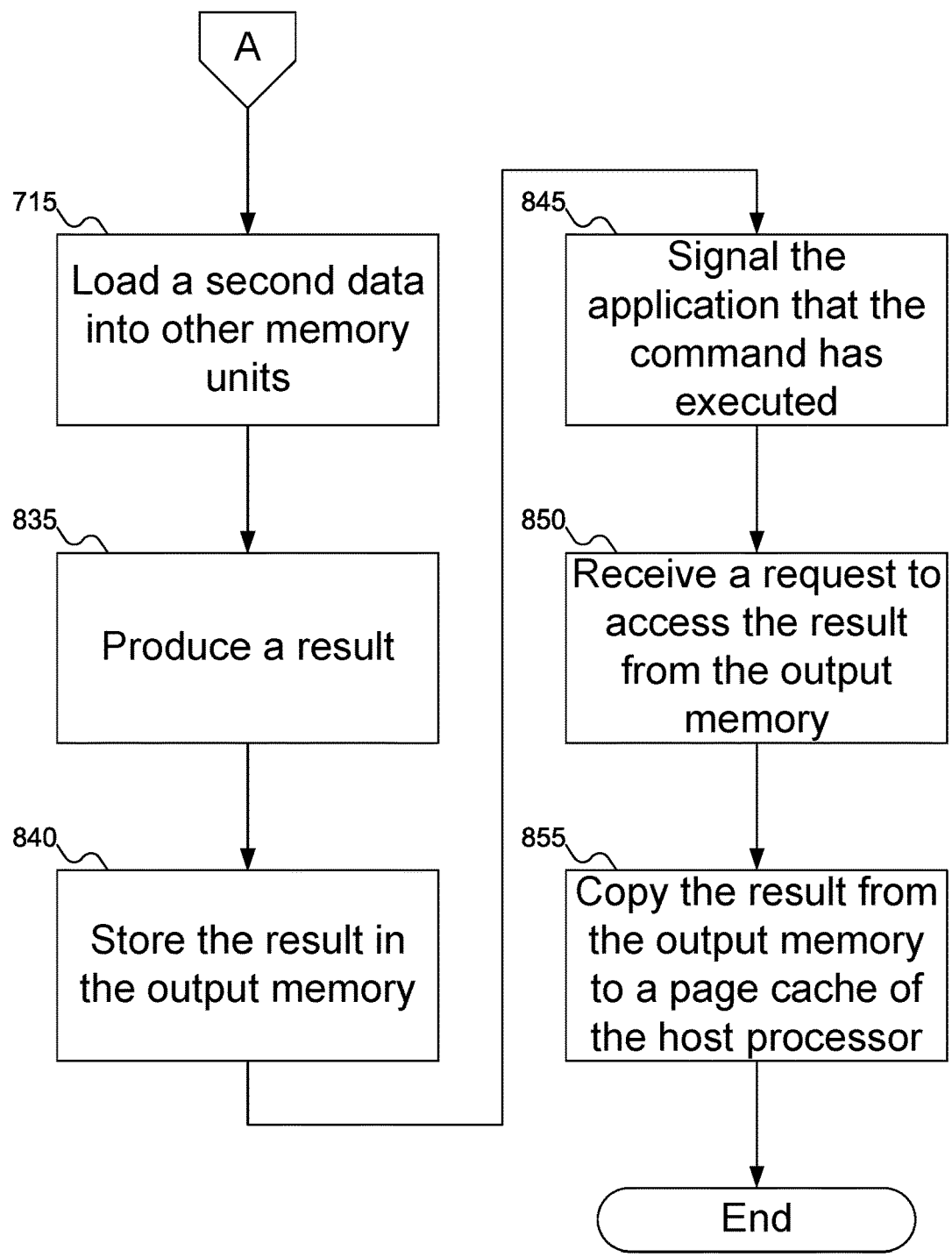
FIG. 8B continues the alternative flowchart of the example procedure to use the accelerator of FIG. 1 to support IMDB processing, according to embodiments of the disclosure.

FIGS. 8A-8B show an alternative flowchart of an example procedure to use accelerator 150 of FIG. 1 to support IMDB processing, according to embodiments of the disclosure. FIGS. 8A-8B are similar to FIG. 7, but more general. In FIG. 8A, at block 805, accelerator device driver 165 of FIG. 1 may receive a request from application 135 of FIG. 1 for accelerator 150 of FIG. 1 to execute a command on data from database 140 of FIG. 1. At block 810, accelerator device driver 165 of FIG. 3 may translate the request into the command to be executed by accelerator 150 of FIG. 1, which may be provided to accelerator 150 of FIG. 1.

At block 815, eraser 615 of FIG. 6 may flush information from accelerator 150 of FIG. 1, such as in on-chip memory 340 of FIG. 3. At block 820, eraser 615 of FIG. 6 may erase input buffer 305 of FIG. 3 and/or output buffer 310 of FIG. 3. At block 825, eraser 615 of FIG. 6 may erase output cache 325 of FIG. 3. As discussed above, in embodiments of the disclosure where data in on-chip memory 340 of FIG. 3, input buffer 305 of FIG. 3, output buffer 310 of FIG. 3, or output memory 325 of FIG. 3 may be overwritten entirely, it erasing these memories may be omitted, as shown by dashed line 830. At block 705, accelerator 150 of FIG. 1 may load data from database 140 of FIG. 1 into memory units 410 of FIG. 4: for example, memory units 410-1 through 410-8 of FIG. 4 in memory block 405-1 of FIG. 4. At block 710, computation engine 320 of FIG. 3 may execute the command on the data in memory units 410 of FIG. 4.

At block 715 (FIG. 8B), accelerator 150 of FIG. 1 may load data into other memory units 410 of FIG. 4: for example, memory units 410-9 through 410-16 of FIG. 4 in memory block 405-2 of FIG. 4. In this manner, on-chip memory 340 of FIG. 3 may be used like a "ping pong" buffer, enabling computational engine 320 of FIG. 3 to execute commands on data in one memory block 405 of FIG. 4 while data is loaded into another memory block 405 of FIG. 4. At block 835, accelerator 150 of FIG. 1 may produce a result. At block 840, accelerator 150 of FIG. 1 may store this result in output memory 325 of FIG. 3. At block 845, 165 device driver 165 of FIG. 3 may signal application 135 of FIG. 1 that the command has been executed. At block 850, accelerator 150 of FIG. 1 may receive a request to access the result from output memory 325 of FIG. 3, and at block 855, accelerator 150 of FIG. 1 may copy the result from output memory 325 of FIG. 1 into page cache 345 of FIG. 3.

Figure 9A:
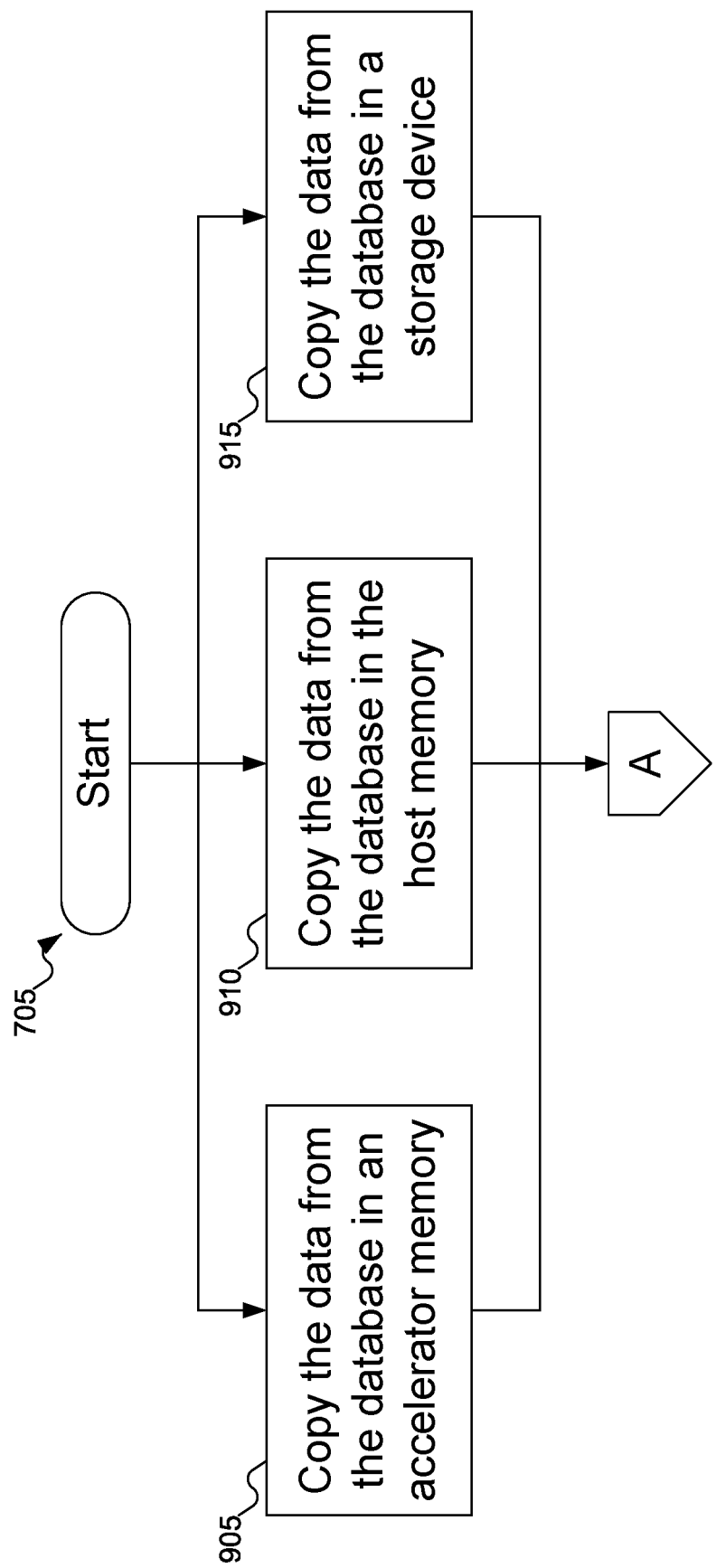
FIG. 9A shows a flowchart of an example procedure to load data from the database of FIG. 1 into the memory of FIG. 4, according to embodiments of the disclosure.
Figure 9B:
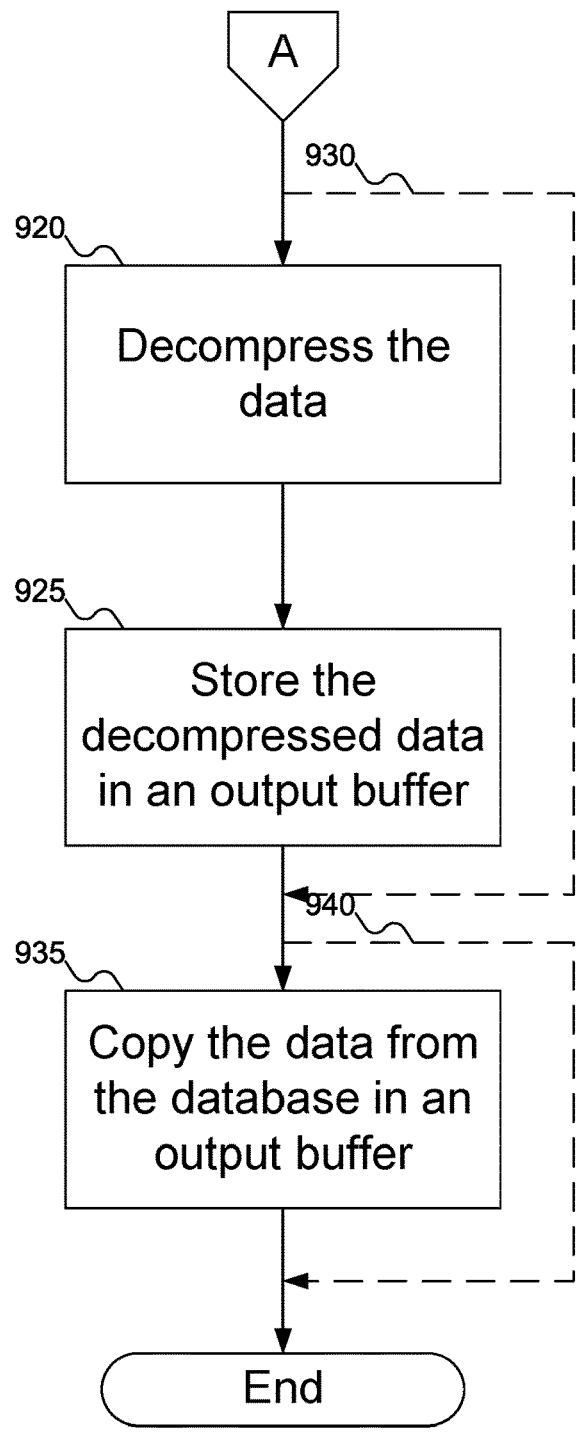
FIG. 9B continues the flowchart of an example procedure to load data from the database of FIG. 1 into the memory of FIG. 4, according to embodiments of the disclosure.

FIGS. 9A-9B show a flowchart of an example procedure to load data from database 140 of FIG. 1 into memory 310 of FIG. 4, according to embodiments of the disclosure. In FIG. 9A, at block 905, accelerator 150 of FIG. 1 may copy the data from database 140 of FIG. 1 in accelerator memory 155 of FIG. 1, if database 140 of FIG. 1 is stored in accelerator memory 155 of FIG. 1. Alternatively, at block 910, accelerator 150 of FIG. 1 may copy the data from database 140 of FIG. 1 in memory 115 of FIG. 1 or accelerator memory 155 of FIG. 1, if database 140 of FIG. 1 is stored in memory 115 of FIG. 1 or accelerator memory 155 of FIG. 1. Alternatively, if database 140 is stored in storage device 120 of FIG. 1, at block 915 accelerator 150 of FIG. 1 may copy the data from database 140 of FIG. 1 in storage device 120 of FIG. 1. Regardless of the source from which the data is copied, the data may be copied into any desired destination, which may include on-chip memory 340 of FIG. 3, input buffer 305 of FIG. 3, or output buffer 310 of FIG. 3, among other possibilities.

If the data is compressed (in which case, for example, the data may be copied into input buffer 305 for decompression), then at block 920 (FIG. 9B) decompressor 315 of FIG. 3 may decompress the data (which may be stored in memory 305 of FIG. 3), and at block 925 accelerator 150 of FIG. 1 may store the decompressed data in output buffer 310 of FIG. 3. Blocks 920 and 925 may be omitted, as shown by dashed line 930. Finally, at block 935, accelerator 150 of FIG. 1 may copy data from output buffer 310 of FIG. 3 into on-chip memory 340 of FIG. 3. Note that if the data was already copied into on-chip buffer 340 of FIG. 3 (for example, in blocks 905, 910, or 915 of FIG. 9A), then block 935 may be omitted, as shown by dashed line 940.

In FIGS. 7-9B, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure may accelerate sparse decompression and may process multiple data streams in a synchronized manner. Some embodiments of the disclosure may include new prefetch, synchronization, and decompression algorithms. In some embodiments of the disclosure, in order to have Data Analysis Expression (DAX) support, a device driver may perform cache invalidation and/or Direct Memory Address (DMA) translation in order to support to host software application.

Embodiments of the disclosure may produce a better system resource utilization and leads to lower latency for online transaction processing (OLTP) workload and better total cost of ownership (TCO).

In-memory database (IMDB) accelerators, such as accelerator 150 of FIG. 1, may play a role in dealing with the growth of database size and real-time analytical queries. Heterogeneous computing may overcome limitations of the central processing unit (CPU): for example, by avoiding thrashing of a cache in the CPU. IMDB accelerators may feature parallel architecture, may move processing closer to data, and may improve resource utilization and TCO.

In embodiments of the disclosure, IMDBs may have a well behaved access pattern that may create challenges to start-of-art CPU cache hierarchy. In some embodiments of the disclosure, near data stream processing may be achieved, and may produce a non-von Neumann stream processor. Embodiments of the disclosure may include accelerator 150 of FIG. 1, which may exploit parallelism in the data and may offload input/output (I/O) intensive operations from the CPU. Embodiments of the disclosure, by reducing CPU cache thrashing behavior from online analytical processing (OLAP) stream workload, may reduce system OLTP query latency and may provide better system resource utilization.

In some embodiments of the disclosure, accelerator 150 of FIG. 1 may be used to offload data intensive OLAP operations, which may reduce CPU cache thrashing and may lead to lower latency for OLAP query.

Embodiments of the disclosure may utilize accelerator 150 of FIG. 1 to reduce unnecessary data movement by processing data nearer to storage. Embodiments of the disclosure may include accelerator 150 of FIG. 1 supporting a parallel processing architecture. Embodiments of the disclosure may also use a software offloading interface, such as an application programming interface (API). With a parallel architecture and an appropriate software/hardware design, embodiments of accelerator 150 of FIG. 1 may out-perform a state of the art CPU.

Embodiments of the disclosure may perform throughput-oriented operations near to the data, which may offer a better resource utilization over traditional CPU compute architecture. This improved resource utilization may translate to a better TCO.

Some embodiments of the disclosure may recognize that database 140 of FIG. 1 may use a sparse compression algorithm to reduce the memory footprint. To avoid a bottleneck at a data intensive decompression ("lookup") operation, embodiments of the disclosure of accelerator 150 of FIG. 1 may use a parallel architecture to accelerate a sparse lookup operation. Some embodiments of the disclosure may prefetch multiple data streams and keep them synchronized through a hardware-based cluster synchronization scheme. Additionally, some embodiments of the disclosure may include a software offloading interface.

Embodiments of the disclose may include accelerator 150 of FIG. 1 for IMDB stream processing that leverages the parallelism and data layout of database 140 of FIG. 1. Embodiments of the disclosure may explore data parallelism and may perform the same operation on multiple data elements. In some embodiments of the disclosure, the hardware architecture may be expanded with data replication to support spatial and temporal parallelism.

Some embodiments of the disclosure may include a massive parallel computing architecture for sparse lookup operations. Some embodiments of the disclosure may include a hardware based prefetch synchronization between multiple processing streams. Some embodiments of the disclosure herein may include an offloading API that manages database accelerator (DBA) hardware functions like data re-alignment between application and DBA, scatter-gather DMA to transfer results to host.

Embodiments of the disclosure offer technical advantages over the prior art. Embodiments of the disclosure may enable near-data processing of various database requests, such as requests that might result in thrashing of the processor cache. Even with simple requests, the host processor may experience bottlenecks with memory-bounded workloads, as data movement may be costly (at least in terms of time). The accelerator may include parallel processing of data from the database, resulting in faster processing of the request, possibly even responding faster than the host processor might respond. In addition, by offloading certain requests to the accelerator, other database requests may be processed by the host processor more quickly.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes an accelerator, comprising:

an on-chip memory including a first memory bank and a second memory bank, the first memory bank configured to store a data from a database, the data including a first value and a second value; and a computational engine to execute, in parallel, a command on the first value in the data and the command on the second value in the data in the on-chip memory, wherein the on-chip memory is configured to load a second data from the database into the second memory bank in parallel with the computation engine executing the command on the first value in the data and executing the command on the second value in the data.

Statement 2. An embodiment of the disclosure includes the accelerator according to statement 1, wherein the database is stored in a host memory of a system.

Statement 3. An embodiment of the disclosure includes the accelerator according to statement 1, wherein the database is stored in an accelerator memory of the accelerator.

Statement 4. An embodiment of the disclosure includes the accelerator according to statement 3, wherein the database may be loaded without accessing a host memory of a system.

Statement 5. An embodiment of the disclosure includes the accelerator according to statement 4, wherein the accelerator is implemented as a memory module.

Statement 6. An embodiment of the disclosure includes the accelerator according to statement 4, wherein an accelerator device driver is configured to load the data into the accelerator memory.

Statement 7. An embodiment of the disclosure includes the accelerator according to statement 6, wherein the accelerator device driver is configured to load the data into the accelerator memory based at least in part on an application partitioning the database.

Statement 8. An embodiment of the disclosure includes the accelerator according to statement 1, wherein the database is stored in a storage device of a system.

Statement 9. An embodiment of the disclosure includes the accelerator according to statement 1, wherein the accelerator is coupled to a system via a bus.

Statement 10. An embodiment of the disclosure includes the accelerator according to statement 1, wherein the on-chip memory is configured to load the data from an output buffer.

Statement 11. An embodiment of the disclosure includes the accelerator according to statement 10, wherein:

the on-chip memory is configured to store an uncompressed data from the database; and the accelerator further comprises an input buffer storing a compressed data.

Statement 12. An embodiment of the disclosure includes the accelerator according to statement 11, wherein the accelerator is configured to pre-fetch data from the database into the input buffer.

Statement 13. An embodiment of the disclosure includes the accelerator according to statement 12, wherein the accelerator is configured to synchronize at least two data streams to pre-fetch data.

Statement 14. An embodiment of the disclosure includes the accelerator according to statement 11, further comprising a decompressor to generate the uncompressed data from the compressed data.

Statement 15. An embodiment of the disclosure includes the accelerator according to statement 1, wherein the first memory bank includes a first memory unit and a second memory unit, the first memory unit storing the data and the second memory unit storing the data.

Statement 16. An embodiment of the disclosure includes the accelerator according to statement 15, wherein the computational engine is configured to execute the command on the first value in the first memory unit and to execute the command on the second value in the second memory unit.

Statement 17. An embodiment of the disclosure includes the accelerator according to statement 15, wherein:

the first memory unit includes a first block random access memory (BRAM); and the second memory unit includes a second BRAM.

Statement 18. An embodiment of the disclosure includes the accelerator according to statement 1, wherein the computational engine is drawn from a set including a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

Statement 19. An embodiment of the disclosure includes the accelerator according to statement 1, further comprising a receiver to receive a request to execute the command on the data from an application running on a host processor of a system.

Statement 20. An embodiment of the disclosure includes the accelerator according to statement 19, wherein the accelerator is configured to load the data into the on-chip memory.

Statement 21. An embodiment of the disclosure includes the accelerator according to statement 20, wherein the accelerator is configured to interface with at least one of a host memory, an accelerator memory, or a storage device storing the data to load the data into the memory.

Statement 22. An embodiment of the disclosure includes the accelerator according to statement 1, further comprising a transmitter to inform an application running on a host processor that the command has been executed.

Statement 23. An embodiment of the disclosure includes the accelerator according to statement 1, further comprising an output memory to store a result of the command.

Statement 24. An embodiment of the disclosure includes the accelerator according to statement 23, wherein the accelerator is configured to transfer the result of the command from the output memory to a page cache of a host processor.

Statement 25. An embodiment of the disclosure includes the accelerator according to statement 1, further comprising an eraser to erase the memory.

Statement 26. An embodiment of the disclosure includes a system, comprising:

a host processor;

a host memory coupled to the host processor; and an accelerator, including:

an on-chip memory including a first memory bank and a second memory bank, the first memory bank configured to store a data from a database, the data including a first value and a second value; and a computational engine to execute, in parallel, a command on the first value in the data and the command on the second value in the data in the on-chip memory, wherein the on-chip memory is configured to load a second data from the database into the second memory bank in parallel with the computation engine executing the command on the first value in the data and executing the command on the second value in the data.

Statement 27. An embodiment of the disclosure includes the system according to statement 26, wherein the database is stored in the host memory.

Statement 28. An embodiment of the disclosure includes the system according to statement 26, wherein the database is stored in an accelerator memory of the accelerator.

Statement 29. An embodiment of the disclosure includes the system according to statement 28, wherein the database may be loaded without accessing the host memory.

Statement 30. An embodiment of the disclosure includes the system according to statement 28, wherein the accelerator is implemented as a memory module in the system.

Statement 31. An embodiment of the disclosure includes the system according to statement 28, wherein an accelerator device driver is configured to load the data into the accelerator memory.

Statement 32. An embodiment of the disclosure includes the system according to statement 31, wherein the accelerator device driver is configured to load the data into the accelerator memory based at least in part on an application partitioning the database.

Statement 33. An embodiment of the disclosure includes the system according to statement 26, further comprising a storage device coupled to the host processor, the storage device storing the database.

Statement 34. An embodiment of the disclosure includes the system according to statement 26, wherein the accelerator is coupled to a system via a bus.

Statement 35. An embodiment of the disclosure includes the system according to statement 26, wherein the on-chip memory is configured to load the data from an output buffer.

Statement 36. An embodiment of the disclosure includes the system according to statement 35, wherein:

the on-chip memory is configured to store an uncompressed data from the database; and the accelerator further includes an input buffer storing a compressed data.

Statement 37. An embodiment of the disclosure includes the system according to statement 36, wherein the accelerator is configured to pre-fetch data from the database into the input buffer.

Statement 38. An embodiment of the disclosure includes the system according to statement 37, wherein the accelerator is configured to synchronize at least two data streams to pre-fetch data.

Statement 39. An embodiment of the disclosure includes the system according to statement 36, wherein the accelerator further includes a decompressor to generate the uncompressed data from the compressed data.

Statement 40. An embodiment of the disclosure includes the system according to statement 26, wherein the first memory bank includes a first memory unit and a second memory unit, the first memory unit storing the data and the second memory unit storing the data.

Statement 41. An embodiment of the disclosure includes the system according to statement 40, wherein the computational engine is configured to execute the command on the first value in the first memory unit and to execute the command on the second value in the second memory unit.

Statement 42. An embodiment of the disclosure includes the system according to statement 40, wherein:

the first memory unit includes a first block random access memory (BRAM); and the second memory unit includes a second BRAM.

Statement 43. An embodiment of the disclosure includes the system according to statement 26, wherein the computational engine is drawn from a set including a Field Programmable Gate Array (FPGA), an Application-Specific Integrated Circuit (ASIC), a central processing unit (CPU), a graphics processing unit (GPU), a general purpose GPU (GPGPU), or a tensor processing unit (TPU).

Statement 44. An embodiment of the disclosure includes the system according to statement 26, wherein the accelerator further includes a receiver to receive a request to execute the command on the data from an application running on the host processor.

Statement 45. An embodiment of the disclosure includes the system according to statement 44, wherein the accelerator is configured to load the data into the on-chip memory.

Statement 46. An embodiment of the disclosure includes the system according to statement 45, wherein the accelerator is configured to interface with at least one of the host memory, an accelerator memory, or a storage device storing the data to load the data into the memory.

Statement 47. An embodiment of the disclosure includes the system according to statement 26, wherein the accelerator further includes a transmitter to inform an application running on the host processor that the command has been executed.

Statement 48. An embodiment of the disclosure includes the system according to statement 26, wherein the accelerator further includes an output memory to store a result of the command.

Statement 49. An embodiment of the disclosure includes the system according to statement 48, wherein:

the processor includes a page cache; and the accelerator is configured to transfer the result of the command from the output memory from the output memory to the page cache of the host processor.

Statement 50. An embodiment of the disclosure includes the system according to statement 26, wherein the accelerator further includes an eraser to erase the memory.

Statement 51. An embodiment of the disclosure includes a method, comprising:

loading a data from a database into a first memory bank of an on-chip memory of an accelerator;

executing, in parallel, a command on a first value in the data in the first memory bank and a second value in the data of the first memory bank to produce a result; and loading a second data from the database into a second memory bank of the on-chip memory in parallel with executing the command on the first value in the data and the second value in the data.

Statement 52. An embodiment of the disclosure includes the method according to statement 51, further comprising receiving a request at the accelerator from an application running on a host processor, the request identifying the data from the database and the command.

Statement 53. An embodiment of the disclosure includes the method according to statement 52, wherein receiving the request at the accelerator from the application running on the host processor includes:

receiving the request at the accelerator from the application running on the host processor via an application programming interface (API); and translating the request into the command.

Statement 54. An embodiment of the disclosure includes the method according to statement 51, wherein loading the data from the database into the first memory bank of the on-chip memory of the accelerator includes copying the data from an output buffer into the on-chip memory.

Statement 55. An embodiment of the disclosure includes the method according to statement 51, wherein loading the data from the database into the first memory bank of the on-chip memory of the accelerator includes copying the data from an accelerator memory into the on-chip memory.

Statement 56. An embodiment of the disclosure includes the method according to statement 55, wherein the database may be copied without accessing a host memory.

Statement 57. An embodiment of the disclosure includes the method according to statement 51, wherein loading the data from the database into the first memory bank of the on-chip memory of the accelerator includes copying the data from a host memory into the on-chip memory.

Statement 58. An embodiment of the disclosure includes the method according to statement 51, wherein loading the data from the database into the first memory bank of the on-chip memory of the accelerator includes copying the data from a storage device into the on-chip memory.

Statement 59. An embodiment of the disclosure includes the method according to statement 51, further comprising erasing the on-chip memory.

Statement 60. An embodiment of the disclosure includes the method according to statement 59, wherein erasing the on-chip memory further comprises erasing an input buffer of the accelerator.

Statement 61. An embodiment of the disclosure includes the method according to statement 59, wherein erasing the on-chip memory further comprises erasing an output buffer of the accelerator.

Statement 62. An embodiment of the disclosure includes the method according to statement 59, wherein erasing the on-chip memory further comprises erasing an output memory of the accelerator.

Statement 63. An embodiment of the disclosure includes the method according to statement 51, wherein loading the data from the database into the first memory bank of the on-chip memory of the accelerator includes:
 loading a compressed data from the database into the accelerator; and
 decompressing the compressed data to generate the data.

Statement 64. An embodiment of the disclosure includes the method according to statement 63, wherein loading the compressed data from the database includes loading the compressed data from the database into an input buffer of the accelerator.

Statement 65. An embodiment of the disclosure includes the method according to statement 64, wherein loading the compressed data from the database into an input buffer of the accelerator includes pre-fetching the compressed data from the database into the input buffer.

Statement 66. An embodiment of the disclosure includes the method according to statement 65, wherein pre-fetching the compressed data from the database into the input buffer includes synchronizing at least two data streams.

Statement 67. An embodiment of the disclosure includes the method according to statement 63, wherein decompressing the compressed data to generate the data includes storing the data in an output buffer of the accelerator.

Statement 68. An embodiment of the disclosure includes the method according to statement 51, further comprising storing the result in an output memory.

Statement 69. An embodiment of the disclosure includes the method according to statement 68, further comprising copying the result from the output memory into a page cache of a host processor.

Statement 70. An embodiment of the disclosure includes the method according to statement 68, wherein copying the result from the output memory into the page cache of the host processor includes copying the result from the output memory into the page cache of the host processor based at least in part on an application running on a host processor requesting the result.

Statement 71. An embodiment of the disclosure includes the method according to statement 68, wherein storing the result in the output cache includes signaling an application running on a host processor that the command has executed.

Statement 72. An embodiment of the disclosure includes the method according to statement 51, wherein:
 loading the data from the database into the first memory bank of the on-chip memory the accelerator includes:
  loading the data from the database into a first memory unit of the first memory bank of the accelerator; and
  loading the data from the database into a second memory unit of the first memory bank of the accelerator; and
 executing, in parallel, the command on the first value in the data in the first memory bank and the second value in the data of the first memory bank to produce the result includes:
  executing the command on the first value in the data in the first memory unit;
  executing the command on the second value in the data in the second memory unit; and
  producing the result based at least in part on executing the command on the first value in the data in the first memory unit and executing the command on the second value in the data in the second memory unit.

Statement 73. An embodiment of the disclosure includes the method according to statement 72, wherein:
 the first memory unit includes a first block random access memory (BRAM); and
 the second memory unit includes a second BRAM.

Statement 74. An embodiment of the disclosure includes an article, comprising a non-transitory storage medium, the non-transitory storage medium having stored thereon instructions that, when executed by a machine, result in:
 loading a data from a database into a first memory bank of an on-chip memory of an accelerator;
 executing, in parallel, a command on a first value in the data in the first memory bank and a second value in the data of the first memory bank to produce a result; and
 loading a second data from the database into a second memory bank of the on-chip memory in parallel with executing the command on the first value in the data and the second value in the data.

Statement 75. An embodiment of the disclosure includes the article according to statement 74, the non-transitory storage medium having stored thereon further instructions that, when executed by the machine, result in comprising receiving a request at the accelerator from an application running on a host processor, the request identifying the data from the database and the command.

Statement 76. An embodiment of the disclosure includes the article according to statement 75, wherein receiving the request at the accelerator from the application running on the host processor includes:
 receiving the request at the accelerator from the application running on the host processor via an application programming interface (API); and
 translating the request into the command.

Statement 77. An embodiment of the disclosure includes the article according to statement 74, wherein loading the data from the database into the first memory bank of the on-chip memory of the accelerator includes copying the data from an output buffer into the on-chip memory.

Statement 78. An embodiment of the disclosure includes the article according to statement 74, wherein loading the data from the database into the first memory bank of the on-chip memory of the accelerator includes copying the data from an accelerator memory into the on-chip memory.

Statement 79. An embodiment of the disclosure includes the article according to statement 74, wherein loading the data from the database into the first memory bank of the on-chip memory of the accelerator includes copying the data from a host memory into the on-chip memory.

Statement 80. An embodiment of the disclosure includes the article according to statement 74, wherein loading the data from the database into the first memory bank of the on-chip memory of the accelerator includes copying the data from a storage device into the on-chip memory.

Statement 81. An embodiment of the disclosure includes the article according to statement 74, the non-transitory storage medium having stored thereon further instructions that, when executed by the machine, result in erasing the on-chip memory.

Statement 82. An embodiment of the disclosure includes the article according to statement 81, wherein erasing the on-chip memory further comprises erasing an input buffer of the accelerator.

Statement 83. An embodiment of the disclosure includes the article according to statement 81, wherein erasing the on-chip memory further comprises erasing an output buffer of the accelerator.

Statement 84. An embodiment of the disclosure includes the article according to statement 81, wherein erasing the on-chip memory includes erasing an output memory of the accelerator.

Statement 85. An embodiment of the disclosure includes the article according to statement 74, wherein loading the data from the database into the first memory bank of the on-chip memory of the accelerator includes:

loading a compressed data from the database into the accelerator; and decompressing the compressed data to generate the data.

Statement 86. An embodiment of the disclosure includes the article according to statement 85, wherein loading the compressed data from the database includes loading the compressed data from the database into an input buffer of the accelerator.

Statement 87. An embodiment of the disclosure includes the article according to statement 86, wherein loading the compressed data from the database into an input buffer of the accelerator includes pre-fetching the compressed data from the database into the input buffer.

Statement 88. An embodiment of the disclosure includes the article according to statement 87, wherein pre-fetching the compressed data from the database into the input buffer includes synchronizing at least two data streams.

Statement 89. An embodiment of the disclosure includes the article according to statement 85, wherein decompressing the compressed data to generate the data includes storing the data in an output buffer of the accelerator.

Statement 90. An embodiment of the disclosure includes the article according to statement 74, the non-transitory storage medium having stored thereon further instructions that, when executed by the machine, result in storing the result in an output memory.

Statement 91. An embodiment of the disclosure includes the article according to statement 90, the non-transitory storage medium having stored thereon further instructions that, when executed by the machine, result in copying the result from the output memory into a page cache of a host processor.

Statement 92. An embodiment of the disclosure includes the article according to statement 90, wherein copying the result from the output memory into the page cache of the host processor includes copying the result from the output memory into the page cache of the host processor based at least in part on an application running on a host processor requesting the result.

Statement 93. An embodiment of the disclosure includes the article according to statement 90, wherein storing the result in the output cache includes signaling an application running on a host processor that the command has executed.

Statement 94. An embodiment of the disclosure includes the article according to statement 74, wherein:

loading the data from the database into the first memory bank of the on-chip memory the accelerator includes:

loading the data from the database into a first memory unit of the first memory bank of the accelerator; and loading the data from the database into a second memory unit of the first memory bank of the accelerator; and executing, in parallel, the command on the first value in the data in the first memory bank and the second value in the data of the first memory bank to produce the result includes:

executing the command on the first value in the data in the first memory unit;

executing the command on the second value in the data in the second memory unit; and producing the result based at least in part on executing the command on the first value in the data in the first memory unit and executing the command on the second value in the data in the second memory unit.

Statement 95. An embodiment of the disclosure includes the article according to statement 94, wherein:

the first memory unit includes a first block random access memory (BRAM); and the second memory unit includes a second BRAM.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. An accelerator, comprising:
an on-chip memory including a first memory bank and a second memory bank, the first memory bank configured to store a data from a database, the data including a first value and a second value; and
a computational engine to execute, in parallel, a command on the first value in the data and the command on the second value in the data in the on-chip memory,
wherein the on-chip memory is configured to load a second data from the database into the second memory bank in parallel with the computation engine executing the command on the first value in the data and executing the command on the second value in the data.

2. The accelerator according to claim 1, wherein the database is stored in an accelerator memory of the accelerator.

3. The accelerator according to claim 1, wherein the on-chip memory is configured to load the data from an output buffer of the accelerator.

4. The accelerator according to claim 3, wherein:
the on-chip memory is configured to store an uncompressed data from the database; and
the accelerator further comprises an input buffer storing a compressed data.

5. The accelerator according to claim 4, further comprising a decompressor to generate the uncompressed data from the compressed data.

6. The accelerator according to claim 1, wherein the first memory bank includes a first memory unit and a second memory unit, the first memory unit storing the data and the second memory unit storing the data.

7. The accelerator according to claim 1, further comprising an output memory to store a result of the command.

8. The accelerator according to claim 7, wherein the accelerator is configured to transfer the result of the command from the output memory to a page cache of a host processor.

9. A system, comprising:
a host processor;
a host memory coupled to the host processor; and
an accelerator, including:
- an on-chip memory including a first memory bank and a second memory bank, the first memory bank configured to store a data from a database, the data including a first value and a second value; and
- a computational engine to execute, in parallel, a command on the first value in the data and the command on the second value in the data in the on-chip memory, wherein the on-chip memory is configured to load a second data from the database into the second memory bank in parallel with the computation engine executing the command on the first value in the data and executing the command on the second value in the data.

10. The system according to claim 9, wherein the database is stored in an accelerator memory of the accelerator.

11. A system according to claim 9, wherein the first memory bank includes a first memory unit and a second memory unit, the first memory unit storing the data and the second memory unit storing the data.

12. A method, comprising:
- loading a data from a database into a first memory bank of an on-chip memory of an accelerator;
- executing, in parallel, a command on a first value in the data in the first memory bank and a second value in the data of the first memory bank to produce a result; and
- loading a second data from the database into a second memory bank of the on-chip memory in parallel with executing the command on the first value in the data and the second value in the data.

13. The method according to claim 12, wherein loading the data from the database into the first memory bank of the on-chip memory of the accelerator includes copying the data from an accelerator memory into the on-chip memory.

14. The method according to claim 12, wherein loading the data from the database into the first memory bank of the on-chip memory of the accelerator includes copying the data from an output buffer of the accelerator into the on-chip memory.

15. The method according to claim 12, wherein loading the data from the database into the first memory bank of the on-chip memory of the accelerator includes:
- loading a compressed data from the database into the accelerator; and
- decompressing the compressed data to generate the data.

16. The method according to claim 15, wherein loading the compressed data from the database includes loading the compressed data from the database into an input buffer of the accelerator.

17. The method according to claim 15, wherein decompressing the compressed data to generate the data includes storing the data in an output buffer of the accelerator.

18. The method according to claim 12, further comprising storing the result in an output memory.

19. The method according to claim 18, further comprising copying the result from the output memory into a page cache of a host processor.

20. The method according to claim 12, wherein:
- loading the data from the database into the first memory bank of the on-chip memory the accelerator includes:
  - loading the data from the database into a first memory unit of the first memory bank of the accelerator; and
  - loading the data from the database into a second memory unit of the first memory bank of the accelerator; and
- executing, in parallel, the command on the first value in the data in the first memory bank and the second value in the data of the first memory bank to produce the result includes:
  - executing the command on the first value in the data in the first memory unit;
  - executing the command on the second value in the data in the second memory unit; and
  - producing the result based at least in part on executing the command on the first value in the data in the first memory unit and executing the command on the second value in the data in the second memory unit.

* * * * *